United States Patent
Black et al.

(10) Patent No.: US 8,213,390 B2
(45) Date of Patent: *Jul. 3, 2012

(54) REVERSE LINK AUTOMATIC REPEAT REQUEST

(75) Inventors: Peter J. Black, San Diego, CA (US); Jun Ma, San Diego, CA (US); Eduardo Esteves, Sao Paulo (BR); Christopher Gerard Lott, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1046 days.

This patent is subject to a terminal disclaimer.

(21) Appl. No.: 10/280,740

(22) Filed: Oct. 24, 2002

(65) Prior Publication Data

US 2004/0081124 A1 Apr. 29, 2004

(51) Int. Cl.
*H04B 7/216* (2006.01)
*G08C 25/02* (2006.01)

(52) U.S. Cl. ........ 370/335; 370/342; 370/320; 370/441; 714/748

(58) Field of Classification Search .................. 370/335, 370/342, 320, 441; 714/748
See application file for complete search history.

(56) References Cited

U.S. PATENT DOCUMENTS

| | | | |
|---|---|---|---|
| 5,289,527 A | 2/1994 | Tiedemann, Jr. | |
| 5,638,412 A | 6/1997 | Blakeney, II et al. | |
| 5,703,902 A | 12/1997 | Ziv et al. | |
| 5,903,554 A | 5/1999 | Saints | |
| 5,931,964 A * | 8/1999 | Beming et al. | 714/748 |
| 5,933,462 A | 8/1999 | Viterbi | |
| 6,275,478 B1 * | 8/2001 | Tiedemann, Jr. | 370/318 |
| 6,335,922 B1 | 1/2002 | Tiedeman, Jr. | |
| 6,418,161 B1 * | 7/2002 | Shively et al. | 375/222 |
| 6,523,091 B2 | 2/2003 | Tirumala | |
| 6,574,211 B2 | 6/2003 | Padovani et al. | |
| 6,711,144 B1 | 3/2004 | Kim et al. | |

(Continued)

FOREIGN PATENT DOCUMENTS

CN 1320307 10/2001

(Continued)

OTHER PUBLICATIONS

Hui Zhao et al., "New Go-Back-N ARQ Protocols for Point-to-Multipoint Communications," IEICE Transactions on Communications, vol. E77-B, No. 8, Aug. 1, 1994, pp. 1013-1022.

(Continued)

*Primary Examiner* — Ronald Abelson
(74) *Attorney, Agent, or Firm* — Charles E. Eggers

(57) ABSTRACT

Upon successful decoding of a first set of slots of a first data packet, an Access Network (AN) can send an acknowledge message (ACK) to an Access Terminal (AT) to indicate that the AN has successfully decoded the data received in the first set of slots of the first data packet. Upon unsuccessful decoding of the first set of slots of the first data packet, the AN can send a negative acknowledge message (NAK) to the AT to indicate that the AN has not successfully decoded the data received in the first set of slots of a first data packet. Based upon receipt of the NAK, the AT can resend the data by sending a second set of slots of the first data packet containing redundant data. Based upon receipt of the ACK, the AT can send a first set of slots of another packet.

35 Claims, 4 Drawing Sheets

U.S. PATENT DOCUMENTS

| | | | |
|---|---|---|---|
| 6,751,480 B2 | 6/2004 | Kogiantis et al. | |
| 6,928,085 B2 * | 8/2005 | Haartsen | 370/462 |
| 6,954,448 B2 | 10/2005 | Farley et al. | |
| 7,099,629 B1 | 8/2006 | Bender | |
| 7,158,504 B2 | 1/2007 | Kadaba et al. | |
| 7,177,660 B2 * | 2/2007 | Moulsley et al. | 455/522 |
| 7,184,401 B2 | 2/2007 | Foore et al. | |
| 7,230,931 B2 | 6/2007 | Struhsaker | |
| 7,353,039 B2 | 4/2008 | Czaja et al. | |
| 2001/0043572 A1 * | 11/2001 | Bilgic et al. | 370/281 |
| 2002/0035681 A1 | 3/2002 | Maturana | |
| 2002/0064167 A1 | 5/2002 | Khan et al. | |
| 2002/0068611 A1 * | 6/2002 | Kogiantis et al. | 455/562 |
| 2002/0097564 A1 | 7/2002 | Struhsaker et al. | |
| 2002/0101839 A1 * | 8/2002 | Farley et al. | 370/329 |
| 2002/0106991 A1 * | 8/2002 | Foore et al. | 455/70 |
| 2002/0136170 A1 * | 9/2002 | Struhsaker | 370/280 |
| 2002/0165445 A1 * | 11/2002 | Uber et al. | 600/407 |
| 2003/0193906 A1 | 10/2003 | Andrews et al. | |
| 2004/0043784 A1 * | 3/2004 | Czaja et al. | 455/522 |
| 2005/0021832 A1 * | 1/2005 | Bennett et al. | 709/235 |
| 2006/0101144 A1 * | 5/2006 | Wiryaman et al. | 709/225 |

FOREIGN PATENT DOCUMENTS

| | | |
|---|---|---|
| CN | 1356803 A | 7/2002 |
| EP | 779755 | 6/1991 |
| JP | 2001523918 | 11/2001 |
| KR | 1020010074801 | 8/2001 |
| KR | 1020020042438 | 6/2002 |
| TW | 507434 | 10/2002 |
| WO | 9610320 | 4/1996 |
| WO | 99/23844 | 5/1999 |
| WO | WO0003495 | 1/2000 |
| WO | WO0219605 | 3/2002 |
| WO | WO02065664 A2 | 8/2002 |
| WO | WO02078371 | 10/2002 |

OTHER PUBLICATIONS

Automatic-Repeat-Request Error-Control Schemes LIN, p. 5-17, Piscataway, New Jamey, IEEE Communications Magazine Dec. 1, 1984.

ISR—WO04038991—May 6, 2004.

ISR—EP1559234—Aug. 3, 2005.

International Search Report—PCT/US03/034516—International Search Authority—European Patent Office Jun. 15, 2004.

International Preliminary Examination Report—PCT/US03/034516—IPEA / US—Sep. 17, 2007.

TIA/EIA/IS-95 "Mobile Station-Rase Station Compatibility Standard for Dual-Mode Wideband Spread Spectrum Cellular System," Jul. 1993.

TIA/EIA/IS-856 "cdma2000 High Rate Packet Data Air Interface Specification" Nov. 2000.

Taiwan Search Report—092129576—TIPO—Mar. 9, 2010.

* cited by examiner

REVERSE LINK AUTOMATIC REPEAT REQUEST

BACKGROUND

1. FIELD

The present invention relates generally to wireless communications, and more specifically to sending data in a wireless communication system.

BACKGROUND

The cdma2000 High Rate Packet Data Air Interface Specification published as TIA/EIA/IS-856, and more specifically the QUALCOMM CDMA2000 1xEV-DO version, is an air interface optimized for the delivery of high-speed wireless data to mobile and fixed terminals.

In 1xEV-DO, an access terminal (AT) is a device with a radio modem and a data interface that allows the user to access a packet data network through the 1xEV-DO access network. An AT is analogous to a Mobile Station in IS-41 cellular network.

An Access Network (AN) is network equipment providing data connectivity between a packet-switched data network, for example, the Internet, and the ATs. As referred to herein, the AN can comprise a modem pool transceiver alone, and, additionally, other network equipment, for example, a modem pool controller.

The forward link (FL) refers to communications from the AN to the AT. Correspondingly, the reverse link (RL) refers to communications from the AT to the AN.

Multiple ATs can be communicating within a sector covered by a single BTS. The AN is limited by a received threshold power. The received power is a function of the number of ATs in the sector and the data rate of each AT in the sector. An AT transmitting at high data rate transmits signals at a higher power than an AT transmitting at a low data rate. When an AN approaches its received threshold power, the AN can send a message on the reverse link activity channel to all ATs in the AN's sector to reduce transmit rate. The reduction in transmit rate can result in reduced throughput, and the limit of the received threshold power can be a limiting factor on the total data throughput of the ATs in the sector.

A need therefore exists for a method and apparatus for increasing the data throughput in a sector.

BRIEF DESCRIPTION OF THE DRAWINGS

FIG. 2 illustrates a method of data transmission by the AT;

DETAILED DESCRIPTION

Figure 1:
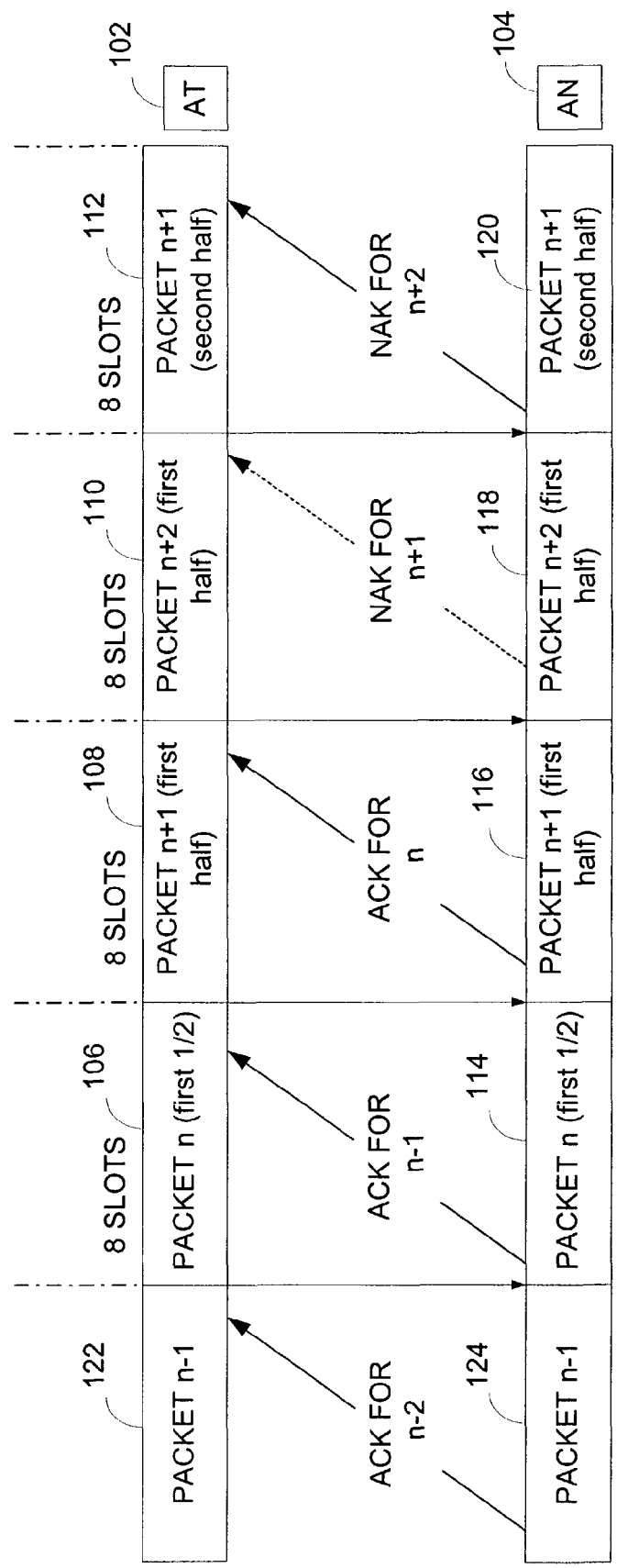
FIG. 1 illustrates the transmission of signals between an AT and an AN.

In a code division multiple access (CDMA) system that conforms to the "TIA/EIA/IS-95 Mobile Station-Base Station Compatibility Standard for Dual-Mode Wideband Spread Spectrum Cellular System," (IS-95) data packets can be retransmitted on the FL. A technique for FL transmission is described in U.S. patent application Ser. No., "Method and Apparatus for High Rate Packet Data Transmission," Ser. No. 08/963,386, filed Nov. 3, 1997. For example, a data packet can comprise a predetermined number of data units, with each data unit identified by a sequence number. Upon incorrect reception of one or more data units by a mobile station, the mobile station can send a negative acknowledgment (NACK), on the RL ACK channel, indicating the sequence numbers of the missing data units for retransmission from the base station. The base station receives the NACK message and can retransmit the data units received in error.

No such acknowledgement or retransmission exists for data transmission in the RL in a CDMA system.

The transmission unit of the physical layer of 1x-EVDO is a physical layer packet. Data is contained in a physical layer packet. In the RL, physical layer packets are contained in frames. Frames can be of 26.66 milliseconds (ms) in duration. A frame can comprise of 16 slots, with each slot 1.66 ms in duration.

Data is modulated at varying data rates in the Reverse Traffic Channel. The data rates can be 9.6 kilobits per second (kbps), 19.2 kbps, 38.4 kbps, 76.8 kbps, and 153.6 kbps. At data rates less than 76.8 kbps, data can be repeated in a frame. For example, at 9.6 kbps, data can be sent in the first two slots of a frame, and the same data repeated 7 times in the next 14 slots of a 16-slot frame; at 19.2 kbps, the data can be sent in the first 4 slots of a frame, and then repeated 3 times in the next 12 slots of a 16-slot frame; at 38.4 kbps, the data can be sent in the first 8 slots of a frame, and then repeated once in the next 8 slots of a 16-slot frame. Although data is not repeated in a frame for a data rate of 76.8 kbps, redundancy is provided by encoding, such as Turbo encoding, as encoding provides redundancy for data at other data rates.

The repetition of data within in a frame, and the redundancy provided by encoding, can advantageously be used to reduce the transmission of redundant data by individual ATs. By reducing the amount of redundant data transmitted by an individual AT in a sector, the data throughput is effectively increased for the sector because the data is transmitted in a shorter duration.

For data rates less than 153.6 kbps, the 16-slot frame can be divided into 16/N sets of slots before transmission by the AT, where N can be 1, 2, 4, or 8. For example, when N equals 2, the AT can transmit the first half of the frame (8 slots) to the AN and hold the second half of the frame in a queue for possible re-transmission of the data depending upon the successful decoding of the data of the first half of the frame as received by the AN.

Automatic repeat request (ARQ) refers to a protocol in which the receiver asks the transmitter to resend data. Upon successful decoding of the first half of the frame, the AN can send an acknowledge message (ACK) to the AT to indicate that the AN has successfully decoded the data received in the first half of the frame. Upon unsuccessful decoding of the first half of the frame, the AN can send a negative acknowledge message (NAK) to the AT to indicate that the AN has not successfully decoded the data received in the first half of the frame.

ACK is a message transmitted to indicate that some data has been received correctly. Typically, if the sender does not receive the ACK message after some predetermined time, or receives a NAK, the original data will be sent again.

NAK is a message transmitted to indicate that some data has been received incorrectly, for example the data may have a checksum error. An alternative to sending a NAK is to use only ACK messages, in which case the non-receipt of an ACK after a certain time is counted as a NAK. As used herein, NAK refers to the receipt of a NAK message or the non-receipt of an ACK.

The ACK or NAK can be sent over a FL ACK channel. In 1xEV-DO, the FL ACK channel can be introduced as a new MAC subchannel. The existing FL Medium Access Control (MAC) channel of 1xEV-DO includes a subchannel referred to as a Reverse Link Power Control (RPC) channel. The RPC channel uses binary phase-shift keying (BPSK) modulation for sending an RPC bit that requests the ATs in the sector to increase or decrease their power. The FL ACK channel can use BPSK modulation on the phase orthogonal to the phase of the RPC channel.

Other techniques can be used to create the FL ACK channel. There currently are 64 MAC subchannels. Some of these subchannels can be used for the FL ACK channel. In this example, the modulation phase of the FL ACK channel do not have to be orthogonal to the RPC channels.

When the AT is in a soft handoff, the ACK bit can be transmitted from only a serving sector or from all sectors in the AT's Active Set.

FIG. 1 illustrates the transmission of signals between an AT 102 and an AN 104 using an ARQ. The AT sends a first set of slots 106 of packet n. In this example, the first set of slots comprises 8 slots. The first set of slots 114 of packet n are received by the AN. Immediately after the first set of slots 106 of packet n are sent by the AT, a first set of slots 108 of packet n+1 are sent by the AT, and the first set of slots 116 of packet n+1 are received by the AN.

Also shown in FIG. 1, a first set of slots 122 of a packet n−1 is sent by AT 102 prior to sending the first set of slots 106 of packet n, and a first set of slots 124 of the packet n−1 is received by AN 104.

Before sending a next set of slots, the AT receives an acknowledgement signal, ACK or NAK, from the AN, that indicates whether the first set of slots 114 of packet n has been successfully decoded or unsuccessfully decoded. The acknowledgement signal informs the AT whether to resend the data, for example, by sending a second set of slots of packet n containing redundant data, or to send new data, for example, a first set of slots from a packet n+2.

In this example, an ACK 122 is sent by the AN to indicate that the first set of slots 114 of packet n has been successfully decoded. The AT receives the ACK, indicating that the first set of slots 110 of packet n+2 can be sent by the AT. The AN receives the first set of slots 118 of packet n+2.

Before sending a next set of slots 112, the AT receives an acknowledgement signal, ACK or NAK, from the AN that indicates whether the first set of slots 116 of packet n+1 has been successfully decoded or unsuccessfully decoded. In this example, the AN sends a NAK. Based upon receipt of the NAK, the AT resends the data by sending a second set of slots 112 of packet n+1 containing redundant data. The AN receives the second set of slots 120 of packet n+1. The AN can combine the data contained in the first set of slots 116 of packet n+1 with the redundant data contained in the second set of slots 120 of packet n+1 and attempt to decode the data contained in the combined sets of slots. With the addition of the redundant data, the likelihood of successfully decoding the data is increased.

One of ordinary skill in the art will appreciate that the data throughput of the system has been increased by not transmitting the redundant data, that is, the second set of slots, when the AN has successfully decoded the data contained in the first set of slots. In this example of two sets of 8 slots, the data throughput can potentially be doubled.

Figure 2:
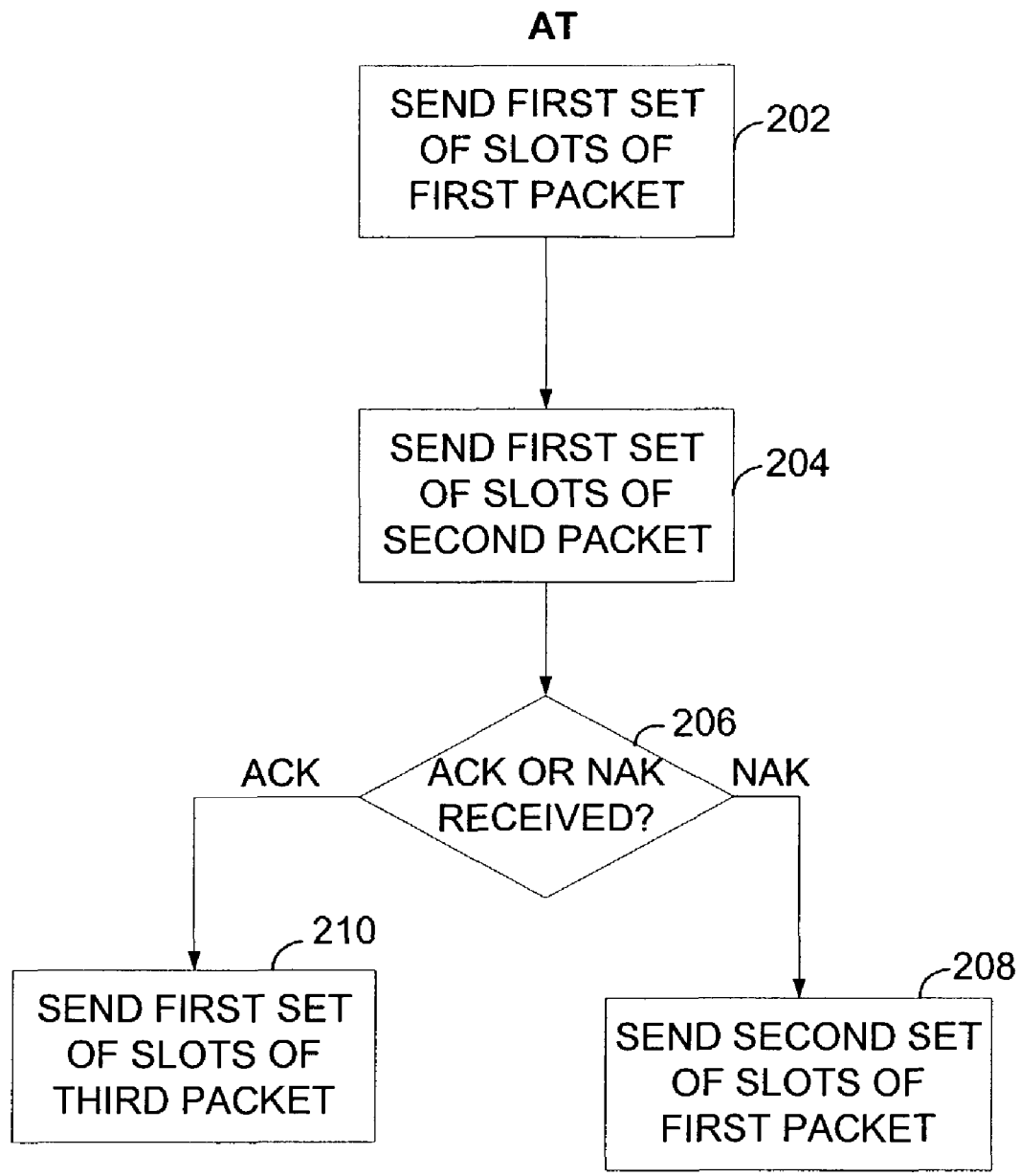

FIG. 2 illustrates a method of data transmission by the AT. At 202, the AT sends the first set of slots of a first packet to the AN. At 204, the AT sends the first set of slots of a second packet to the AN. One of ordinary skill in the art will appreciate that when the packet is divided into more than two sets, for example, four sets of slots of four slots each, additional transmissions of first sets of packets can be performed before proceeding to 206.

At 206, the AT determines whether an ACK or a NAK from the AN has been received by the AT. In this example, the ACK indicates that the first set of slots of the first packet has been successfully decoded by the AN, and the NAK indicates that the first set of slots of the first packet has not been successfully decoded by the AN.

When the ACK has been received, the AT sends the first set of slots of a third packet at 210. When the NAK has been received, the AT sends a second set of slots of the first packet at 208.

The preceding example is for a packet that is divided into two sets of eight slots. One of ordinary skill in the art will appreciate that a packet can be divided into more than two halves.

For example, if the packet is divided into four sets of slots of four slots each, the AT can send a first set of slots of a first packet at 202, and then the AT can send a first set of slots of a second packet at 204. When an ACK is received by the AT corresponding to successful decoding of the first set of slots of the first packet by the AN at 206, the AT can send a first set of slots of a third packet at 210. When a NAK is received by the AT corresponding to unsuccessful decoding of the first set of slots of the first packet by the AN at 206, the AT can send a second set of slots of the first packet at 208.

Furthermore, when an ACK, corresponding to successful decoding of the first set of slots of the second packet by the AN (not shown), is received by the AT, the AT can either send (a) a first set of slots of a fourth packet provided that the first set of slots of the first packet was also successfully decoded, or (b) the first set of slots of the third packet provided that the first set of slots of the first packet was unsuccessfully decoded.

When a NAK is received by the AT corresponding to unsuccessful decoding of the first set of slots of the second packet by the AN (not shown), the AT can send the second set of slots of the second packet.

The process can be continued similarly for other sets of slots.

Additionally, the AT can sequentially send the first set of slots of the first packet at 202, the first set of slots of the second packet at 204, the first set of slots of the third packet (not shown) and the first set of slots of the fourth packet (not shown). The AN can receive the first three set of slots before sending an acknowledgement signal for the first set of slots of the first packet. When an ACK is received by the AT corresponding to successful decoding of the first set of slots of the first packet by the AN at 206, the AT can send a first set of slots of a fifth packet at 210. When a NAK is received by the AT corresponding to unsuccessful decoding of the first set of slots of the first packet by the AN at 206, the AT can send the second set of slots of the first packet at 208.

Furthermore, when an ACK is received by the AT corresponding to successful decoding of the first set of slots of the second packet by the AN, the AT can send a first set of slots of a sixth packet (not shown). When a NAK is received by the AT corresponding to unsuccessful decoding of the first set of slots of the second packet by the AN, the AT can send the second set of slots of the second packet (not shown).

The process can be continued similarly for other sets of slots.

Moreover, one of ordinary skill in the art will appreciate that other combinations of sending slots by the AT and sending acknowledgment signals by the AN can be made and fall within the scope of the appended claims.

Figure 3:
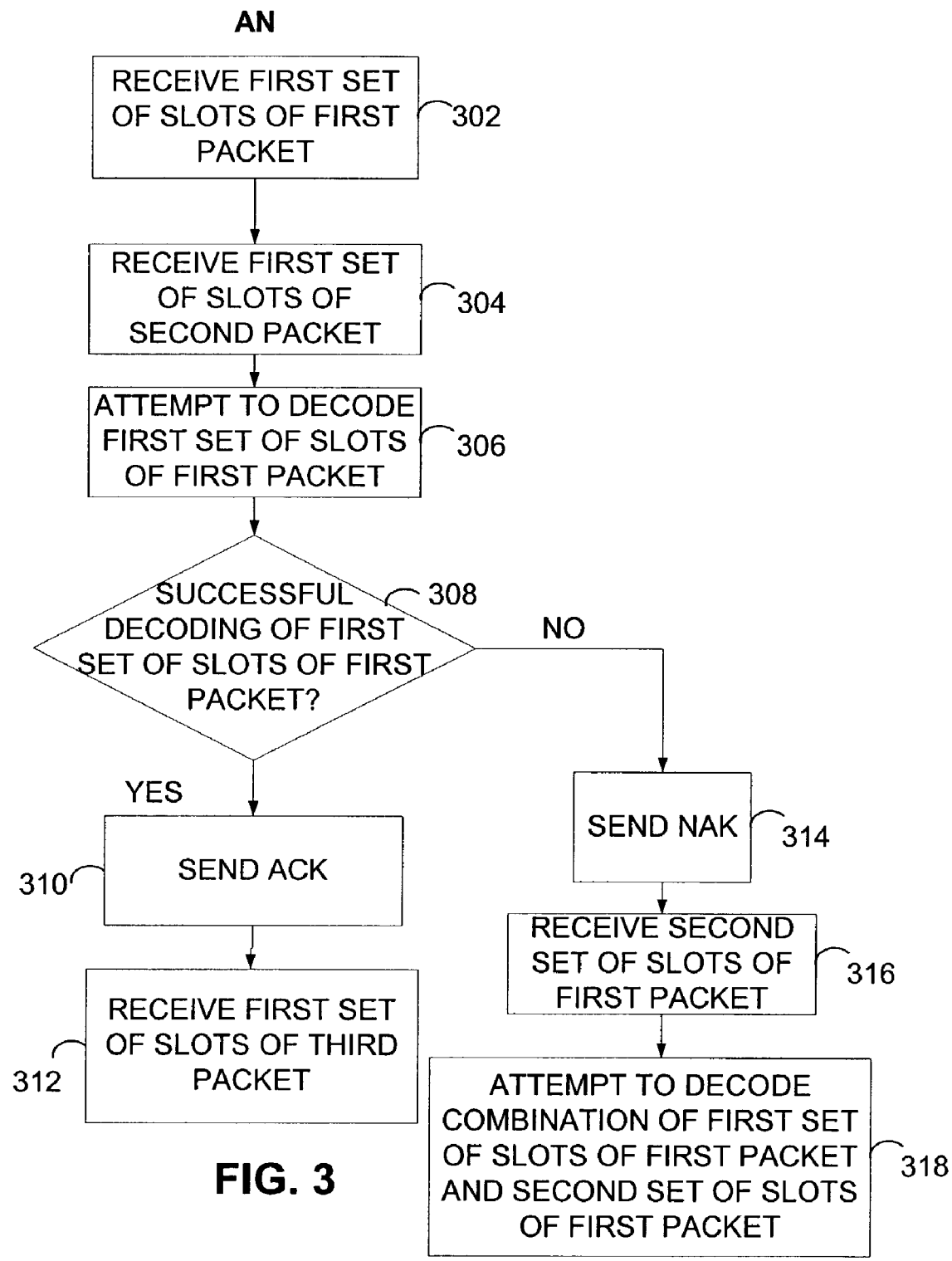
FIG. 3 illustrates a method of data transmission by the AN.

FIG. 3 illustrates a method of data transmission by the AN corresponding to the method of data transmission by the AT shown in FIG. 2.

At 302, the AN receives the first set of slots of the first packet. At 304, the AN receives the first set of slots of the second packet. At 306, the AN attempts to decode the first set of slots of the first packet. Although the attempt to decode 306 is shown after the receipt of the first set of slots of the second packet, the AN can attempt to decode the first set of slots of the first packet before or after the receipt of the first set of slots of the second packet, or in parallel with the receipt of the first set of slots of the second packet.

At 308, the AN determines whether the first set of slots of the first packet has been successfully decoded. When the AN is successful in decoding the first set of slots of the first packet, the AN sends an ACK to the AT at 310, and receives the first set of slots of the third packet at 312. When the AN is unsuccessful in decoding the first set of slots of the first packet, the AN sends a NAK to the AT at 314, receives the second set of slots of the first packet at 316, and attempts to decode the combination of the first set of slots of the first packet and the second set of slots of the first packet at 318.

The preceding example is for a packet that is divided into two sets of eight slots. One of ordinary skill in the art will appreciate that a packet can be divided into more than two halves as described with reference to FIG. 2.

The timing of the sending of the ACK or the NAK can be independent of the number of sets of slots received. The AN can send the ACK or the NAK at a time after decoding a corresponding received set or sets of slots, for example, at 308, and before the AT needs the acknowledgement signal to make the determination to send a particular set of slots at 206. The timing of the sending of the ACK or the NAK can be independent of the interleaving of the sets of slots.

Figure 4:
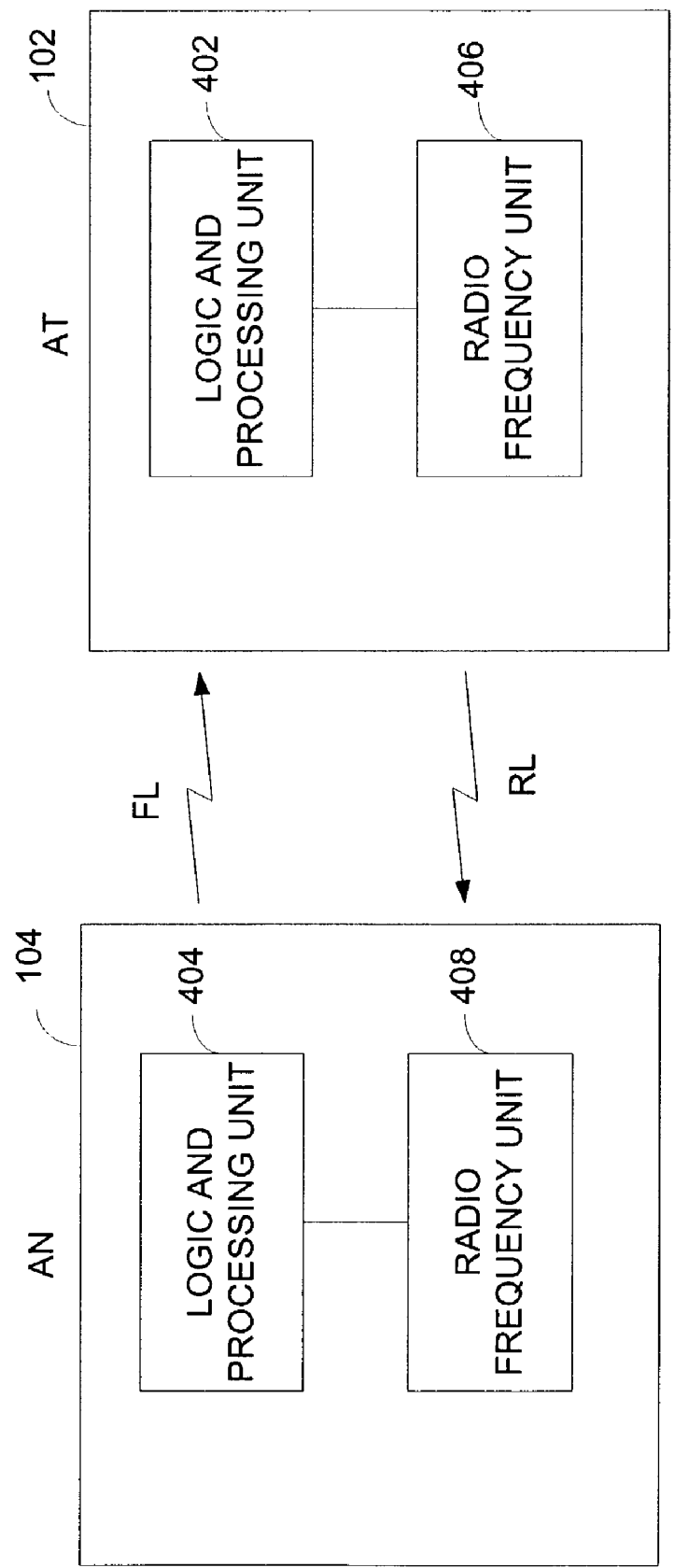
FIG. 4 illustrates a block diagram of an AT and an AN in a wireless communication system.

FIG. 4 illustrates a block diagram of an AT 102 and an AN 104 in wireless communication system. Conventional hardware and software techniques can be employed by the AT and the AN. Both the AT and the AN can comprise a logic and processing unit 402 or 404, respectively, and a radio frequency unit 406 and 408, respectively, for carrying out the above-described functionality. For example, one of ordinary skill in the art will appreciate that the radio frequency units can send and receive signals between the AN and AT, and that the logic and processing units can perform the logical operations and processing of signals.

Although the foregoing description was made with specific reference to the 1xEV-DO communication system, the reverse link automatic repeat request can also be utilized in other CDMA systems.

The previous description of the disclosed embodiments is provided to enable a person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of sending data on a reverse link of a wireless communication system, comprising:

sending, by an Access Terminal, a first set of slots of a first packet to an Access Network, wherein the first packet includes the first set of slots and a second set of slots;

sending, by the Access Terminal, a first set of slots of a second packet to the Access Network immediately after the first set of slots of the first packet is sent;

determining, by the Access Terminal, whether an ACK or a NAK corresponding to successful or unsuccessful decoding, respectively, of the first set of slots of the first packet from the Access Network has been received by the Access Terminal, wherein the first set of slots of the first packet is acknowledged independently by the Access Network from the first set of slots of the second packet; and if the ACK has been received, sending, by the Access Terminal, a first set of slots of a third packet.

2. The method of claim 1 further comprising:

if the NAK has been received, sending, by the Access Terminal, the second set of slots of the first packet.

3. The method of claim 1 further comprising:

receiving, by the Access Network, the first set of slots of the first packet;

attempting, by the Access Network, to decode the received first set of slots of the first packet;

determining, by the Access Network, whether the received first set of slots of the first packet has been successfully decoded; and if the Access Network is successful in decoding the received first set of slots of the first packet, sending, by the Access Network, the ACK to the Access Terminal.

4. The method of claim 3 further comprising:

if the Access Network is unsuccessful in decoding the received first set of slots of the first packet, sending, by the Access Network, the NAK to the Access Terminal.

5. The method of claim 1, further comprising determining, by the Access Terminal, whether an ACK or a NAK corresponding to successful or unsuccessful decoding, respectively, of the first set of slots of the second packet from the Access Network has been received by the Access Terminal.

6. A method of sending data on a reverse link of a wireless communication system, comprising:

sending, by an Access Terminal, a first set of slots of a first packet to an Access Network, wherein the first packet includes the first set of slots and a second set of slots;

sending, by the Access Terminal, a first set of slots of a second packet to the Access Network immediately after the first set of slots of the first packet is sent;

determining, by the Access Terminal, whether an ACK or a NAK corresponding to successful or unsuccessful decoding, respectively, of the first set of slots of the first packet from the Access Network has been received by the Access Terminal, wherein the first set of slots of the first packet is acknowledged independently by the Access Network from the first set of slots of the second packet; and if the NAK has been received, sending, by the Access Terminal, the second set of slots of the first packet.

7. The method of claim 6 further comprising:

receiving, by the Access Network, the first set of slots of the first packet;

attempting, by the Access Network, to decode the received first set of slots of the first packet;

determining, by the Access Network, whether the received first set of slots of the first packet has been successfully decoded; and if the Access Network is unsuccessful in decoding the received first set of slots of the first packet, sending, by the Access Network, the NAK to the Access Terminal.

8. The method of claim 7 further comprising:
if the Access Network is successful in decoding the received first set of slots of the first packet, sending, by the Access Network, the ACK to the Access Terminal.

9. The method of claim 6, further comprising determining, by the Access Terminal, whether an ACK or a NAK corresponding to successful or unsuccessful decoding, respectively, of the first set of slots of the second packet from the Access Network has been received by the Access Terminal.

10. A method of receiving data on a reverse link of a wireless communication system, comprising:
receiving, by an Access Network, a first set of slots of a first packet from an Access Terminal, wherein the first packet includes the first set of slots and a second set of slots;
receiving, by the Access Network, a first set of slots of a second packet from the Access Terminal immediately after the first set of slots of the first packet is received;
attempting, by the Access Network, to decode the received first set of slots of the first packet;
determining, by the Access Network, whether the received first set of slots of the first packet has been successfully decoded; and
if the Access Network is successful in decoding the received first set of slots of the first packet, sending, by the Access Network, an ACK to the Access Terminal, wherein the first set of slots of the first packet is acknowledged independently by the Access Network from the first set of slots of the second packet.

11. The method of claim 10 further comprising:
if the Access Network is unsuccessful in decoding the received first set of slots of the first packet, sending, by the Access Network, a NAK to the Access Terminal.

12. The method of claim 11 further comprising:
receiving, by the Access Network, the second set of slots of the first packet from the Access Terminal; and
attempting, by the Access Network, to decode a combination of the received first set of slots of the first packet and the received second set of slots of the first packet.

13. The method of claim 10, wherein the ACK is sent by the Access Network on a forward link ACK channel, wherein the ACK is sent in a phase orthogonal to the phase of a reverse link power control channel.

14. The method of claim 10, further comprising sending, by the Access Network, an ACK or a NAK corresponding to successful or unsuccessful decoding, respectively, of the first set of slots of the second packet from the Access Terminal.

15. An Access Terminal comprising:
a radio frequency unit configured to,
send a first set of slots of a first packet, wherein the first packet includes the first set of slots and a second set of slots;
send a first set of slots of a second packet immediately after the first set of slots of the first packet is sent; and
receive an ACK or a NAK for the first set of slots of the first packet, wherein the first set of slots of the first packet is acknowledged independently by an Access Network from the first set of slots of the second packet; and
a logic and processing unit configured to,
determine whether the ACK or the NAK has been received;
wherein the radio frequency unit is further configured to,
send a first set of slots of a third packet if the ACK has been received, and
send the second set of slots of the first packet if the NAK has been received.

16. The Access Terminal of claim 15, wherein
the received ACK or NAK corresponds to the first set of slots of the first packet; and
said radio frequency unit is further configured to receive an ACK or a NAK corresponding to successful or unsuccessful decoding, respectively, of the first set of slots of the second packet.

17. The Access Terminal of claim 16, wherein
said radio frequency unit is further configured to receive an ACK or a NAK corresponding to successful or unsuccessful decoding, respectively, of the first set of slots of the third packet.

18. An Access Network comprising:
a radio frequency unit configured to,
receive a first set of slots of a first packet, wherein the first packet includes the first set of slots and a second set of slots;
receive a first set of slots of a second packet immediately after the first set of slots of the first packet is received; and
a logic and processing unit configured to,
attempt to decode the received first set of slots of the first packet, and
determine whether the received first set of slots of the first packet has been successfully decoded;
wherein the radio frequency unit is further configured to,
send an ACK if the logic and processing unit is successful in decoding the first packet, and
send a NAK if the logic and processing unit is unsuccessful in decoding the first Packet,
wherein the first packet is acknowledged independently by the Access Network from the second packet.

19. The Access Network of claim 18, wherein:
the radio frequency unit is further configured to,
receive the second set of slots of the first packet; and
the logic and processing unit is further configured to,
attempt to decode a combination of the received first set of slots of the first packet and the received second set of slots of the first packet.

20. The Access Network of claim 18, wherein the radio frequency unit is further configured to:
send a reverse link power control bit on a reverse link power control channel; and
send the ACK or the NAK on a forward link ACK channel, wherein the ACK or NAK is sent in a phase orthogonal to the phase of the reverse link power control channel.

21. The Access Network of claim 18, wherein said radio frequency unit is further configured to send an ACK or a NAK corresponding to successful or unsuccessful decoding, respectively, of the first set of slots of the second packet.

22. An apparatus comprising:
means for sending a first set of slots of a first packet to an Access Network, wherein the first packet includes the first set of slots and a second set of slots;
means for sending a first set of slots of a second packet to the Access Network immediately after the first set of slots of the first packet is sent;
means for determining whether an ACK or a NAK corresponding to successful or unsuccessful decoding, respectively, of the first set of slots of the first packet from the Access Network has been received, wherein the first set of slots of the first packet is acknowledged independently by the Access Network from the first set of slots of the second packet; and
means for sending a first set of slots of a third packet to the Access Network if the ACK has been received.

23. The apparatus of claim 22, further comprising means for determining whether an ACK or a NAK corresponding to successful or unsuccessful decoding, respectively, of the first set of slots of the second packet from the Access Network has been received.

24. The method of claim 23, further comprising means for determining whether an ACK or a NAK corresponding to successful or unsuccessful decoding, respectively, of the first set of slots of the third packet from the Access Network has been received.

25. An apparatus comprising:
means for sending a first set of slots of a first packet to an Access Network, wherein the first packet includes the first set of slots and a second set of slots;
means for sending a first set of slots of a second packet to the Access Network immediately after the first set of slots of the first packet is sent;
means for determining whether an ACK or a NAK corresponding to successful or unsuccessful decoding, respectively, of the first set of slots of the first packet from the Access Network has been received, wherein the first set of slots of the first packet is acknowledged independently by the Access Network from the first set of slots of the second packet; and
means for sending the second set of slots of the first packet if the NAK has been received.

26. The apparatus of claim 25, further comprising means for determining whether an ACK or a NAK corresponding to successful or unsuccessful decoding, respectively, of the first set of slots of the second packet from the Access Network has been received.

27. An apparatus comprising:
means for receiving a first set of slots of a first packet from an Access Terminal, wherein the first packet includes the first set of slots and a second set of slots;
means for receiving a first set of slots of a second packet from the Access Terminal immediately after the first set of slots of the first packet is received;
means for attempting to decode the received first set of slots of the first packet;
means for determining whether the received first set of slots of the first packet has been successfully decoded; and
means for sending an ACK to the Access Terminal if the received first set of slots of the first packet is successfully decoded, wherein the first set of slots of the first packet is acknowledged independently by the Access Network from the first set of slots of the second packet.

28. The apparatus of claim 27, further comprising means for sending an ACK to the Access Terminal if the received first set of slots of the second packet is successfully decoded.

29. A processor-readable medium comprising processor-executable instructions for:
sending, by an Access Terminal, a first set of slots of a first packet to an Access Network, wherein the first packet includes the first set of slots and a second set of slots;
sending, by the Access Terminal, a first set of slots of a second packet to the Access Network immediately after the first set of slots of the first packet is sent;
determining, by the Access Terminal, whether an ACK or a NAK corresponding to successful or unsuccessful decoding, respectively, of the first set of slots of the first packet from the Access Network has been received by the Access Terminal, wherein the first set of slots of the first packet is acknowledged independently by the Access Network from the first set of slots of the second packet; and
if the ACK has been received, sending, by the Access Terminal, a first set of slots of a third packet.

30. The processor-readable medium of claim 29, further comprising processor-executable instructions for
determining, by the Access Terminal, whether an ACK or a NAK corresponding to successful or unsuccessful decoding, respectively, of the first set of slots of the second packet from the Access Network has been received by the Access Terminal.

31. The processor-readable medium of claim 30, further comprising processor-executable instructions for
determining, by the Access Terminal, whether an ACK or a NAK corresponding to successful or unsuccessful decoding, respectively, of the first set of slots of the third packet from the Access Network has been received by the Access Terminal.

32. A processor-readable medium comprising processor-executable instructions for:
sending, by an Access Terminal, a first set of slots of a first packet to an Access Network, wherein the first packet includes the first set of slots and a second set of slots;
sending, by the Access Terminal, a first set of slots of a second packet to the Access Network immediately after the first set of slots of the first packet is sent;
determining, by the Access Terminal, whether an ACK or a NAK corresponding to successful or unsuccessful decoding, respectively, of the first set of slots of the first packet from the Access Network has been received by the Access Terminal, wherein the first set of slots of the first packet is acknowledged independently by the Access Network from the first set of slots of the second packet; and
if the NAK has been received, sending, by the Access Terminal, the second set of slots of the first packet.

33. The processor-readable medium of claim 32, further comprising processor-executable instructions for
determining, by the Access Terminal, whether an ACK or a NAK corresponding to successful or unsuccessful decoding, respectively, of the first set of slots of the second packet from the Access Network has been received by the Access Terminal.

34. A processor-readable medium comprising processor-executable instructions for:
receiving, by an Access Network, a first set of slots of a first packet from an Access Terminal, wherein the first packet includes the first set of slots and a second set of slots;
receiving, by the Access Network, a first set of slots of a second packet from the Access Terminal immediately after the first set of slots of the first packet is received;
attempting, by the Access Network, to decode the received first set of slots of the first packet;
determining, by the Access Network, whether the received first set of slots of the first packet has been successfully decoded; and
if the Access Network is successful in decoding the received first set of slots of the first packet, sending, by the Access Network, an ACK to an Access Terminal, wherein the first set of slots of the first packet is acknowledged independently by the Access Network from the first set of slots of the second packet.

35. The processor-readable medium of claim 34, further comprising processor-executable instructions for
sending, by the Access Network, an ACK or a NAK corresponding to successful or unsuccessful decoding, respectively, of the first set of slots of the second packet from the Access Terminal.

* * * * *